June 26, 1956

R. W. KLING 2,752,193

REAR DUMP TRAILER

Filed Jan. 17, 1955

INVENTOR.
Robert W. Kling
BY
G. Thrall Brewer
Attorney

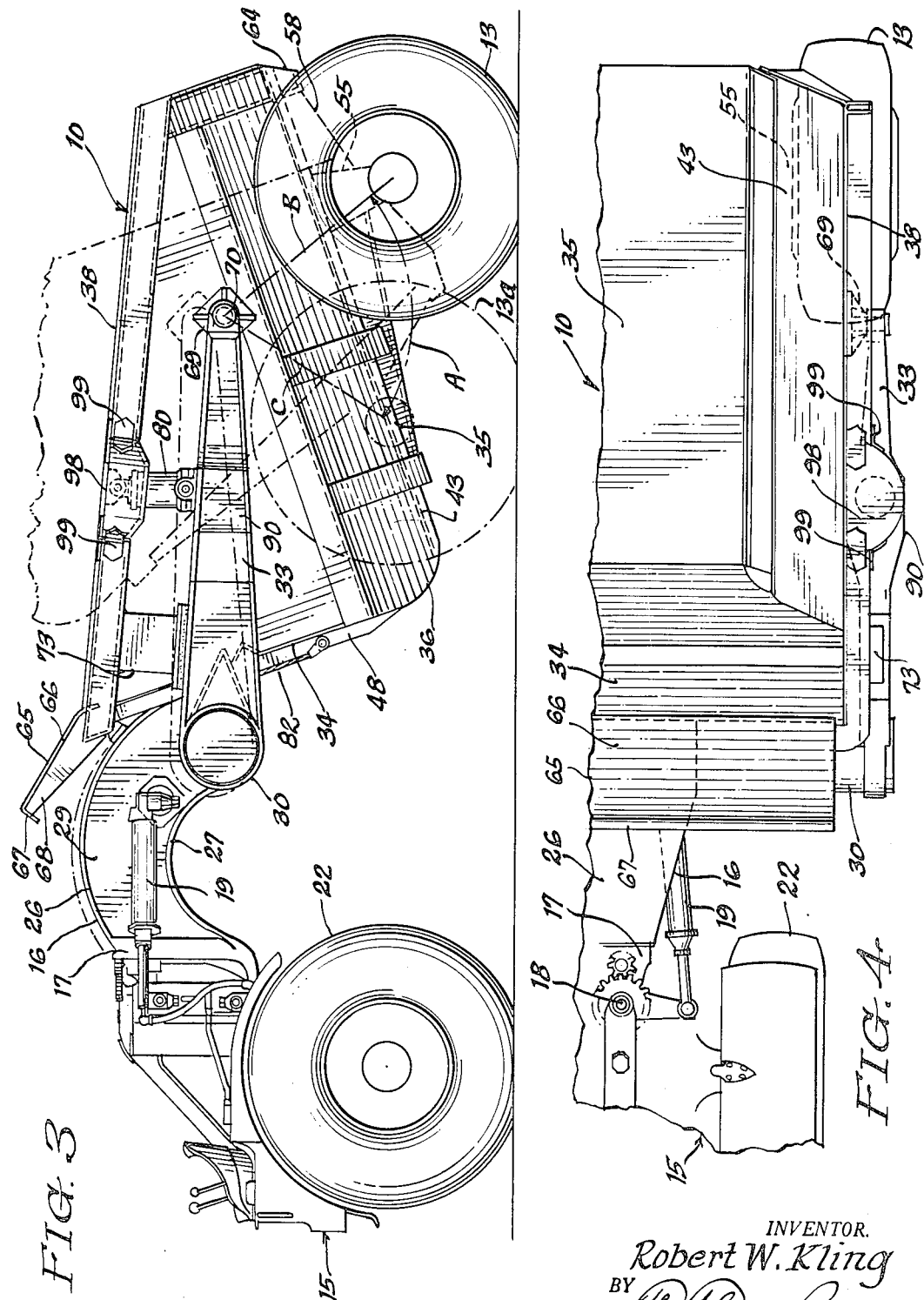

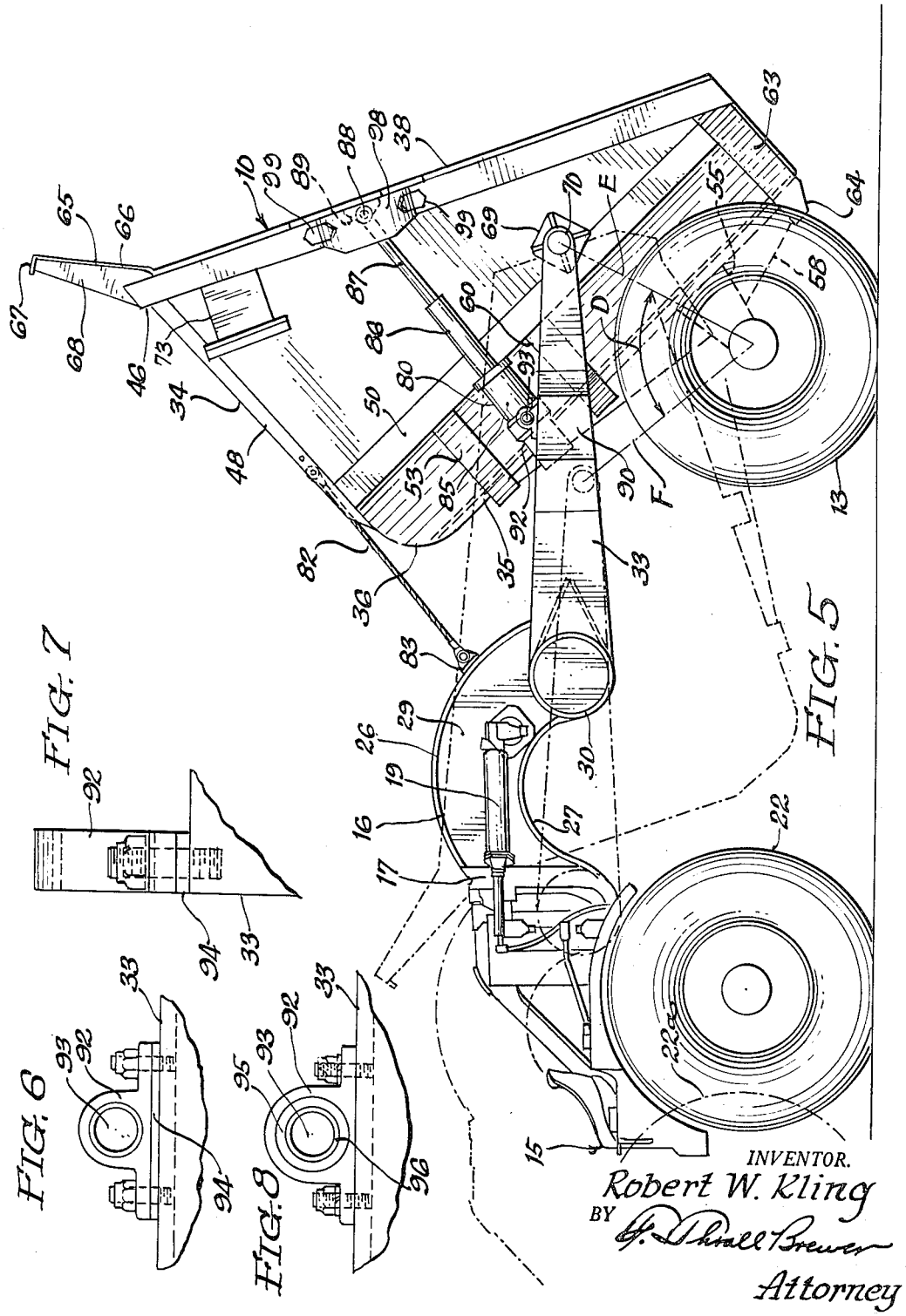

United States Patent Office 2,752,193
Patented June 26, 1956

2,752,193

REAR DUMP TRAILER

Robert W. Kling, Wilmette, Ill., assignor to Athey Products Corporation, Chicago, Ill., a corporation of Illinois Application January 17, 1955, Serial No. 482,142

15 Claims. (Cl. 298—22)

This invention relates to load hauling trailer units, and more particularly to such trailer units which are adapted to the dumping of the load from the rear of the trailer body.

One of the more general objects of my invention is to provide a rugged and frameless trailer structure adapted to dumping at the rear and also to motivation by a two-wheel tractor.

As another relatively general object, the invention has within its purview the provision of a rear dump trailer provided with hydraulically operated mechanisms for steering and dumping.

More specifically, my invention comprehends the provision of a rear dump trailer adapted to use with a tractor and wherein either the tractor or trailer wheels may be locked by brake action during dumping, thereby to effect either "spread" or "spot" dumping action.

My invention also has within its purview the provision of a rear dump trailer for use with a two-wheel tractor, and wherein the body swings relative to two fixedly spaced axes during movements between hauling and dumping position; the structure and arrangement being such that during the swinging movements of the body, one of said axes moves in a substantially arcuate path relative to the other, and the arc of movement affording a position of maximum rise for one of the axes practically midway of the arcuate path between the hauling and dumping positions, whereby tilting movements of the tractor and the effort required for the dumping movements are minimized.

It is a further object of the invention to provide a rear dump trailer having a body tiltable to a relatively steep angle relative to a draft yoke for dumping, and wherein the body and draft yoke are connected and relatively disposed to effect a low center of gravity which affords stability for operation over rough terrain.

These and other objects of this invention will become apparent from the following detailed description when taken together with the accompanying drawings, in which:

Fig. 3 is a fragmentary side elevational view of the trailer-tractor combination, with the hauling position of the body depicted in full lines and dumping positions of the trailer wheels and trailer body illustrated in dot-and-dash lines, the trailer wheels being moved longitudinally of the trailer in this instance during the movement of the body to the dumping position;

Fig. 4 is a fragmentary top plan view of the trailer-tractor combination;

Figure 1:
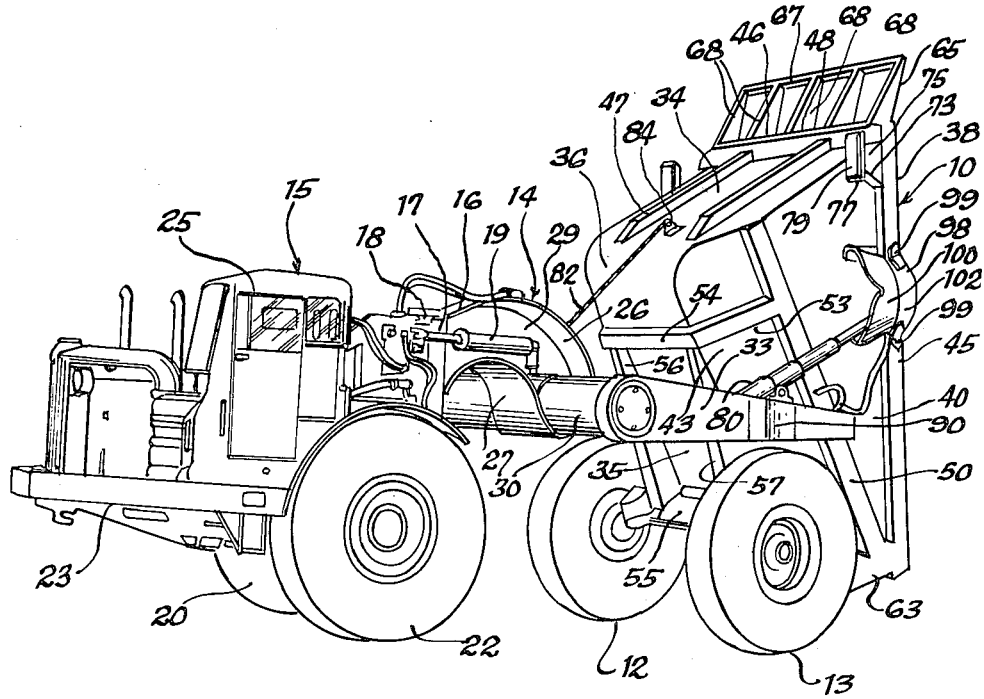
Fig. 1 is a perspective view taken from one side of a rear dump trailer embodying my invention and showing the trailer body in a dumping position, the trailer also being shown in operative association with a two-wheel tractor.

Fig. 5 is a fragmentary side elevational view of the trailer-tractor combination wherein the trailer body is shown in the dumping position in solid lines, and in the normal hauling position in dot-and-dash lines, the trailer wheels remaining substantially stationary in this illustrated dumping operation while the tractor wheels move longitudinally of the trailer during the movement of the body between the hauling and dumping positions;

Figs. 6 and 7 are fragmentary side elevational and end elevational views respectively of a detail of structure incorporated in a preferred embodiment of my rear dump trailer; and Fig. 8 is a fragmentary side elevational view of a modified form of the structure illustrated in Figs. 6 and 7.

Considered in its more general aspects, the exemplary embodiment of my rear dump trailer which is disclosed herein for illustrative purposes includes as two of its principal elements a body 10 supported near its rear end by wheels 12 and 13 and a draft yoke 14 through which the body 10 is connected to motivating means such as a two-wheel tractor 15. The front end of the draft yoke 14, in the disclosed structure, constitutes a gooseneck structure 16 which has a bolster casting 17 secured to its front end. Through the bolster casting 17, the trailer is movably coupled to the tractor 15 by a kingpin 18. The trailer swings laterally relative to the tractor about the axis of the kingpin 18 for steering purposes, and the draft coupling structure on the tractor is constructed and arranged to afford freedom for both rocking and vertical swinging movements of the trailer relative to the tractor during movements of the tractor-trailer combination over uneven terrain. In the operation of the disclosed combination, steering is controlled from the tractor through hydraulic controls which, in the present instance, include hydraulic rams, such as 19, which afford added connections between the tractor and the gooseneck structure on opposite sides of the gooseneck.

The disclosed tractor 15 has driven wheels 20 and 22 from which an underframe 23 projects forwardly, and which underframe has a prime mover, such as an internal combustion engine 24, mounted thereon, as well as supporting an operator's cab 25, from which the tractor is driven.

Having more detailed reference to the rear dump trailer disclosed, the gooseneck structure 16 has top and bottom plates 26 and 27 respectively and side plates 28 and 29, which side plates are interposed between the top and bottom plates and diverge rearwardly from the front bolster casting 17. The top, bottom and side plates of the gooseneck are secured together, as by welding along their adjacent surfaces, to provide a hollow box-type structure which is substantially rigid, although relatively light in weight. At the rear end of the gooseneck, the top, bottom and side plates 26, 27, 28 and 29 are secured, as by welding, to the mid-portion of a laterally extending and hollow torque tube 30, the torque tube of the disclosed structure desirably being circular in section and projecting substantially equidistantly on opposite sides of the gooseneck.

Side arms 32 and 33 extend rearwardly in substantially parallel relationship to one another from opposite end portions of the torque tube 30, those side arms being fabricated in box-like section from plate stock and secured to the end portions of the torque tube by welding. In the disclosed structure, the side arms 32 and 33 taper to smaller sectional dimensions toward the rear. The draft yoke structure thus provided is substantially rigid from end to end and includes the rugged torque tube 30 from the mid-portion of which the gooseneck 16 projects forwardly and from the opposite ends of which the side arms 32 and 33 project rearwardly in spaced and substantially parallel relationship.

The trailer body 10 has a front wall 34 and a bottom 35 joined through an intervening curved portion 36. In the normal hauling position of the body, the front wall slopes somewhat to the rear toward the bottom, and the bottom slopes upwardly toward the rear, as shown in Fig. 3. Side walls 37 and 38 adjoin the front wall and bottom to define a structure which is open at the top and at the rear end. The side walls 37 and 38 have upper portions 39 and 40 of generally triangular shape which are disposed in spaced, opposed and substantially parallel relationship relative to one another. Also, the side walls have lower portions 42 and 43 which adjoin the upper portions 39 and 40 respectively and converge inwardly to adjoin the bottom 35. The bottom, front wall and side wall portions are, in each instance, made of rugged plate stock and are welded together at their adjacent edges. In some instances, the bottom and wall panels are made of metal plates having a wood panel filler therebetween to provide for the absorption of shocks in loading, as well as for the hauling of heavy loads.

In the disclosed structure, the body is reinforced by ribs secured to the external surface thereof. Channels 44 and 45 are secured to and extend longitudinally of the top margins of the side walls 37 and 38. Also, a channel 46 extends across the top margin of the front wall 34 and is secured thereto, as well as to the channels 44 and 45. The channels 44, 45 and 46 each face inwardly and reinforce the top marginal portion and top edge of the body. On the front wall 34, channel type ribs 47 and 48 are secured to the external surface of that wall and extend downwardly from the channel 46 on opposite sides of the mid-portion of the front wall. At the junctures of the upper and lower portions of the side walls 37 and 38, reinforcing ribs which, in the present instance, are in the form of angle strips, are secured to the upper margins of the lower side wall portions 42 and 43 respectively and extend longitudinally thereof. Near the front of the body, inwardly facing channels 52 and 53 extend downwardly from the reinforcing ribs 49 and 50 on opposite sides of the body and are adjoined at their ends by a cross channel which extends laterally across the bottom, as well as being connected to the lower ends of the channels 52 and 53.

Near the rear end of the body, a fabricated rear axle structure 55 extends across the bottom 35 and is secured thereto so that it is a part of the general body structure. This rear axle structure 55 is of downwardly tapering box section, fabricated from steel plates and terminating at its ends in steel castings from which stub axles project beyond the sides of the bottom to provide mountings for the trailer wheels 12 and 13. Extending longitudinally of the body bottom 35 and along the opposite margins thereof are two fabricated channel structures 56 and 57 which are secured to the bottom 35 to afford longitudinal rigidity. These fabricated channel structures 56 and 57 extend from the cross channel 54 to the rear axle 55 and are secured to each. Also, in the disclosed structure, the fabricated channels 56 and 57 are tapered, so that they become deeper in section from front to rear. In substantial alignment with the fabricated bottom channels 56 and 57 and extending from the rear of the axle structure 55 toward the rear of the body bottom are additional fabricated channel structures 58 which serve as longitudinal rigidifying braces for the rear end portion of the body. These fabricated channel structures also taper, so as to become deeper in section adjacent the rear axle.

At positions between the inwardly facing channels 52 and 53 on the opposite sides of the lower portion of the body side walls 37 and 38, additional inwardly facing channels 59 and 60 extend downwardly along the lower portions of the respective side walls and are secured thereto, as well as having their opposite ends secured to the longitudinally extending ribs 49 and 50 and the fabricated channel structures 56 and 57. At the rear end of the body, fabricated channels 62 and 63 extend downwardly along the rear margins of the side walls 37 and 38 from the lower surfaces of the channels 44 and 45, and are secured to both the side walls and the top channels, as well as to the rear ends of the ribs 49 and 50. An additional fabricated channel 64 extends across the rear margin of the bottom 35 and is secured thereto, as well as to the lower ends of the fabricated channels 62 and 63.

At the top of the front wall of the body an apron 65 extends across the body and projects forwardly of the front wall to prevent material from being spilled forwardly on the gooseneck and associated structure during loading and hauling operations. This apron includes a top plate 66 which extends forwardly across the upper surface of the channel 46 and projects forwardly therefrom with a downwardly extending forward end flange 67 thereon. At its side margins and between those side margins, the plate 66 is supported from the channel 46 by laterally spaced fabricated channels 68.

The rear ends of the side arms 32 and 33 are connected to the exteriors of the body side walls 37 and 38 through stub axle castings such as 69, which stub axle castings have shaft portions 70 in co-axial relationship and projecting outwardly from opposite sides of the trailer body; the shaft portions being journalled in bearings secured in the end portions of the side arms and serving as fulcrums for vertical tilting movements of the trailer body relative to the draft frame. The side arms 32 and 33 are, of course, spaced laterally from the side walls of the body, so that the body is free to move relative thereto.

The location of the stub axle castings 69 on the side walls of the body is determined by various factors. The position must, of course, afford freedom of movement of the body relative to the draft frame between a normal load hauling position and a position in which the body surfaces are tilted sufficiently to the rear to insure quick and complete dumping of material from the body through the open rear end thereof. The positions of the stub axle castings 69 in the disclosed structure are also below the top edges of the side wall, so that with the arrangement of structure herein illustrated, the center of gravity of the trailer is low, thereby to afford operating stability. Furthermore, as may be observed by reference to Figs. 3 and 5, the structure and operation of my disclosed rear dump trailer is such that the distance between the trailer and tractor wheels varies during the dumping operation of the trailer body. That is, if the tractor wheels are locked by their brakes during the dumping of the body, the dumping action effects a forward movement of the trailer wheels, between hauling and dumping positions, as depicted in solid lines at 13 and in dot-and-dash lines at 13a respectively, in Fig. 3. When the trailer wheels are locked by their brakes during the dumping of the body and the tractor wheels are free to move, the dumping of the body effects a rearward movement of the tractor wheels from a normal hauling position to a dumping position, as depicted at 22a and 22 respectively, in Fig. 5.

In order to minimize the forward tilting movement of the two wheel tractor during the dumping of the trailer body, and also to minimize the effort required for accomplishing the dumping and return movements of the trailer body relative to the draft frame, the axis of the stub shaft portions 70 of the stub axle casting 69, in the disclosed structure, is so located relative to the axis of the trailer wheels that those axes not only cross during the dumping and return movements, but the extreme positions of the axes between the normal and dumping positions are practically equally spaced on opposite sides of a central plane at which the axes cross one another. As shown in Fig. 3, the rear axle shaft moves in an arcuate path A beneath the axis of the stub shafts 70 between positions indicated by planes B and C passing through the shaft axes, and the axes cross one another at the mid-portion of the arcuate path. As depicted in Fig. 5, the axis of the stub shafts 70 moves across the axis of the trailer wheels in an arcuate path, as indicated at D, between planes E and F passing through those axes, and again the axes cross at the mid-portion of the path of arcuate movement. As may be readily understood, these relative positions of the axis of the stub shafts 70 and the axis of the rear wheels limits the required vertical movement of the body during its dumping and return movements relative to the draft yoke.

Supporting feet 72 and 73 are secured to the front portions of opposite side walls of the trailer body at positions to engage and rest upon the forward portions of the side arms 32 and 33 of the draft yoke to support the front end of the body in its normal hauling position relative to the draft yoke during ordinary hauling operations. These supporting feet include fabricated channels 74 and 75 secured to the upper portions 39 and 40 of the side walls and to the lower surfaces of the channels 44 and 45 which extend longitudinally of the top margins of the side walls. In addition, the supporting feet have bottom plates 76 and 77 secured to the lower surfaces of the fabricated channels, and which plates have resilient pads 78 and 79 secured to their lower surfaces for engagement with the top surfaces of the side arms 32 and 33, the resilient pads being provided to aid in the absorption of shocks and to even the distribution of stresses at the two sides of the body.

Figure 2:
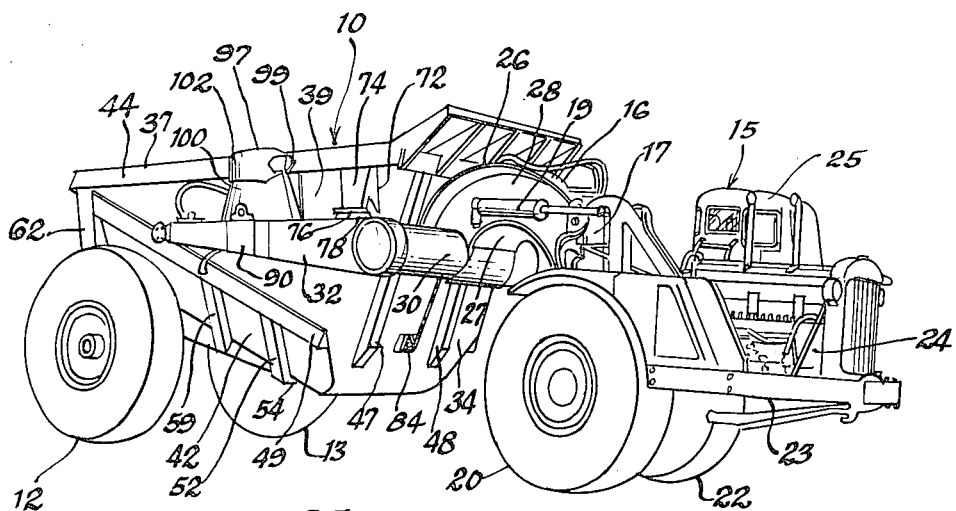
Fig. 2 is a perspective view of the tractor-trailer combination taken from the side opposite that illustrated in Fig. 1 and showing the trailer body in its normal load hauling position.

As depicted in Figs. 2 and 3, the structure and shape of the disclosed trailer body, the structure of the draft yoke and the relative relationship of the body and draft yoke are such that in the normal hauling position, the top edges of the front and side walls of the body are practically horizontal. This affords good load retaining characteristics. Also in the normal load hauling position of the body, the bottom thereof slopes downwardly for load retaining purposes and also to effect a distribution of the load between the trailer and tractor wheels which affords adequate traction at the tractor wheels. The front and side walls extend to a level above the rear end of the bottom for providing large load carrying capacity, and the rear end is open in order to eliminate the necessity of using a tailgate or other such movable part which would be apt to get damaged or out of order. It may also be observed in more particular respect to the dumping of the body that when the body reaches its ultimate dumping position, as depicted in Fig. 5, the bottom is at a relatively steep angle with respect to the horizontal, so that any material in the body will flow readily through the rear opening of the body. Furthermore, it may be observed that after the axes of the stub shafts 70 and the trailer wheels cross one another in the movement toward the dumping position, the body reaches a position of balance such that gravitational force tends to assist its movement toward the dumping position, and applied force is required for effecting the initial portion of the return of the dump body toward the normal load hauling position.

For effecting the dumping and initial return movements of the trailer body relative to the draft frame, I have utilized hydraulic rams, such as 80, which act between the mid-portions of the side arms 32 and 33 of the draft frame and the top portion of the body at a position somewhat ahead of the longitudinal center of the body. Fluid under pressure for the operation of the hydraulic rams is obtained from a pressure pump on the tractor and control is effected from the operator's cab. In order that the rams may occupy or require only relatively small space when collapsed and may extend sufficiently to produce the required movement of the body for dumping purposes, I have utilized multi-stage rams which, in the present instance, extend to between two and three times their normal collapsed length. In order to provide the force for effecting the initial return movement of the trailer body from its dumping position to a position in which gravity will complete the return movement, at least one of the ram stages is double acting. A flexible connecting element, such as a cable 82, has one end secured to a bracket 83 on the rear portion of the top plate 26 of the gooseneck structure and its other end connected to a bracket on the lower mid-portion of the front wall 34 of the body to serve as a stop for limiting the movement of the body to a definite position for dumping and to prevent the body movement from going beyond the desirable extension of the hydraulic rams 80. The cable length and its fastening positions are selected so that the cable does not interfere with the movement of the body to its normal hauling position.

Each of the hydraulic rams 80 has an exterior or base housing portion 85 and portions 86 and 87 which telescope into the base housing 84 with one end of the portion 87 extending outwardly and connected through a cross pin 88 to a bracket 89 on the top marginal portion of the body side wall.

At the mid-portion of each of the side arms 32 and 33 of the draft yoke, a side plate structure 90 is secured to the external side surface of the arm and suitably reinforced to enlarge the mid-portion of each arm in its vertical section. Also, an opening is made in the top of each arm at the mid-portion of the position of the side plate structure 90 to provide a well into which the lower portion of each of the rams 80 may extend. On the top surfaces of the side arms, bearing blocks such as 92 are secured thereto and have trunnions, such as 93, on opposite sides of each hydraulic ram journalled therein to support the ram through its outer housing 85 for swinging movement in a plane extending longitudinally of each side arm.

As depicted in Figs. 6 and 7, one embodiment of my disclosed trailer structure includes a pad 94 of resilient material, such as rubber, interposed between each bearing block 92 and the top surface of the side arm upon which it is mounted. Such resilient pads afford some flexibility in the mountings of the hydraulic rams to compensate for slight variations in alignment or movement which may occur. As shown in Fig. 8, a modification of the structure illustrated in Figs. 6 and 7 is provided by utilizing a ring-type resilient pad 95 between a bearing ring 96 in which the trunnions 93 are journalled, and the external portion of the bearing block.

As shown in Figs. 1 and 2, the hydraulic rams are protected from falling material and from being struck by a portion of a shovel or the like during loading by guards 97 and 98, which guards are secured to the exterior surfaces of the channels 44 and 45 at the tops of the side walls 37 and 38 by fastening means such as brackets 99 which are welded in place. Also, each guard includes a skirt portion 100 which extends downwardly along the side wall from a top rim portion 102.

From the foregoing description and reference to the accompanying drawings, it may be understood that I have produced a substantially frameless and hydraulically actuated rear dump trailer which has a low center of gravity affording stable operation and which is extremely rugged. The rear dump trailer herein disclosed is adapted to either "spot" or "spread" dumping and is so constructed and arranged that the dumping is accomplished with a minimum of effort and with a minimum required tilting movement of the tractor by which it is motivated.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a rear dump trailer, the combination comprising a body shaped for rear dumping and including side walls and a bottom which normally slopes downwardly from the rear toward the front, axle means secured to the body and having wheels thereon providing a support for the body, said body being tiltable in a vertical plane between hauling and dumping positions, the center of gravity of the body being normally in front of the axle means when the body is in the hauling position and rearward of the axle means when the body is in the dumping position, a draft yoke including side arms which extend rearwardly in spaced relationship to the opposite side walls of the body, means connecting the side arms to the adjacent side walls of the body at positions normally forward and above the axle means so that the body is swingable relative to the side arms between said hauling and dumping positions, and hydraulic rams mounted on the side arms forwardly of the last mentioned means and connected to the body for lifting the body upwardly at the front end relative to the draft yoke to the dumping position, said hydraulic rams being of the multi-stage type with one stage of a length to raise the body to a position in which the body bottom is approximately level and one stage double acting for returning the body from the dumping position to one in which gravitational forces urge the body toward the hauling position.

2. In a rear dump trailer, the combination comprising a load carrying body adapted for rear dumping and including side walls and a bottom, axle means secured to the body and having wheels thereon providing a support for the body, a draft yoke including side arms which extend rearwardly in spaced relationship to opposite side walls of the body, means connecting the side arms to the side walls of the body so that the body is swingable in a vertical plane relative to the side arms between hauling and dumping positions, and hydraulic rams mounted on the side arms forwardly of the last mentioned means and connected to the body for tilting the body upwardly at the front end to the dumping position, the mid-portions of the side arms of the draft yoke being enlarged laterally with respect to the end portions thereof and having top openings therein at the enlarged mid-portions to provide wells in which the lower ends of said hydraulic rams are mounted.

3. In a rear dump trailer including a body having side walls and a bottom, axle means secured to said body, wheel means carried by said axle means and providing a support for the body, means for generating the dumping force moment for tilting said body from a normal load carrying position to a rear dumping position, said means including a draft yoke having a plurality of elongated and horizontally spaced side arms, each of said arms having a pivotal connection to the adjacent side wall of the body to provide for swinging movement of the body relative to the side arms, said side arms extending forwardly from the pivotal connections and having longitudinal axes located above the upper peripheries of said wheel means and below the upper edges of the side walls, a hydraulically actuated, multi-stage ram pivotally mounted on each side arm at a fixed position forward of said pivotal connection and extending upwardly therefrom so that the dumping force moment is generated about the pivotal connections, each of said rams also having a pivotal connection to the adjacent side wall of the body at a position such that the rams are disposed in a common plane which is substantially normal to the axes of the side arms when said body is in the normal position.

4. In a rear dump trailer as defined in claim 3, the combination being further characterized by resilient cushioning means embodied in the mounting of each hydraulic ram on its respective side arm and disposed between the ram and the side arm to provide for movements of the ram laterally of the side arm during movements of the body between normal and dumping positions.

5. In a rear dump trailer as defined in claim 3, the pivotal connections of the side arms to the side walls of the body being substantially on the longitudinal axes of the arms, said arms having top surfaces spaced above the longitudinal axes of the side arms, and the rams being mounted on the side arms for swinging movements longitudinally of the side arms about axes located above said top surfaces of the side arms.

6. In a rear dump trailer including a body having side walls and a bottom, axle means secured to said body, wheel means carried by said axle means and providing a support for the body, means for tilting said body from a normal load carrying position to a rear dumping position, said means including a draft yoke having a plurality of elongated and horizontally spaced side arms in substantially parallel relationship to one another, each of said arms extending along and being connected to an adjacent side wall of the body for rotational movement relative thereto and extending forwardly from the connection thereof to the side wall, said arms having longitudinal axes disposed in a common substantially horizontal plane located above the upper peripheries of said wheel means and below the upper edges of the side walls, a hydraulically actuated ram pivotally mounted on each side arm and extending upwardly therefrom at a given position forward of said connection of the side arm to the body side wall and pivotally secured to the adjacent side wall of the body, said rams being disposed in a common plane which is substantially normal to the axes of the side arms when said body is in the normal position, said side arms being hollow and of box-type section and having openings in the longitudinal mid-portions of the tops thereof, and said rams extending into the arms through said openings and being swingably mounted on the arms for movements about axes above the tops of the arms.

7. In a rear dump trailer including a body having side walls and a bottom, axle means secured to said body, wheel means carried by said axle means and providing a support for the body, means for tilting said body from a normal load carrying position to a rear dumping position, said means including a draft yoke having a plurality of elongated and horizontally spaced side arms in substantially parallel relationship to one another, each of said arms extending along and being connected to an adjacent side wall of the body for rotational movement relative thereto and extending forwardly from the connection thereof to the side wall, said arms having longitudinal axes disposed in a common substantially horizontal plane located above the upper peripheries of said wheel means and below the upper edges of the side walls, a hydraulically actuated ram pivotally mounted on each side arm and extending upwardly therefrom at a given position forward of said connection of the side arm to the body side wall and pivotally secured to the adjacent side wall of the body, said rams being disposed in a common plane which is substantially normal to the axes of the side arms when said body is in the normal position, and the longitudinal mid-portions of the side arms being enlarged laterally with respect to the end portions thereof and having top openings therein at the enlarged mid-portions to provide wells in which the lower ends of the rams are mounted.

8. In a rear dump trailer including a body having side walls and a bottom which normally slopes downwardly toward the front of the trailer, axle means secured to the body, wheel means carried by said axle means and providing a support for the body, means for tilting said body from a normal load carrying position to a rear dumping position in which the bottom of the body slopes rearwardly, said means including a draft yoke having a plurality of elongated and horizontally spaced side arms, each of said arms being connected to an adjacent side wall of the body for rotational movement relative thereto and extending forwardly from the connection thereof to the side wall, said arms having longitudinal axes located above the upper peripheries of said wheel means and below the upper edges of the side walls, a multi-stage hydraulically actuated ram pivotally mounted on each side arm and extending upwardly therefrom at a position forward of said connection of the side arm to the body side wall and pivotally secured to the adjacent side wall of the body, said rams being disposed approximately normal to the longitudinal axes of the respective side arms when the body is in the normal position, and said rams having first lifting stages which raise the body to a position in which the bottom is approximately level.

9. In a rear dump trailer, the combination comprising a body which is open at the back end and has side and front end walls and a bottom that slopes downwardly toward the front, wheel and axle means supporting the body near the near end thereof, a draft yoke including side arms which extend rearwardly in spaced relationship to opposite side walls of the body, means connecting the rear ends of the side arms to the side walls of the body at positions below the tops of the side walls and so that the body is swingable in a vertical plane relative to the side arms, and hydraulic rams mounted on the side arms forwardly of the last mentioned means and connected to the body for tilting the body upwardly at the front end to a dumping position relative to the draft yoke, the mid-portions of the side arms of the draft yoke being enlarged laterally with respect to the end portions thereof and having top openings therein at the enlarged mid-portions to provide wells in which the lower ends of said hydraulic rams are mounted.

10. In a rear dump trailer as defined in claim 8, the combination being further characterized by resilient cushioning means embodied in the mounting of each hydraulic ram on the respective side arm and disposed between the ram and the side arm to provide for movements of the ram laterally of the side arm during movements of the body between normal and dumping positions.

11. In a rear dump trailer as defined in claim 8, the connections of the side arms to the side walls of the body being substantially on the longitudinal axes of the arms, said arms having top surfaces spaced above the longitudinal axes of the side arms, and the rams being mounted on the side arms for swinging movements longitudinally of the side arms about axes located above said top surfaces of the side arms.

12. In a rear dump trailer, the combination comprising a body which is open at the top and at the back end and has side and front end walls and a bottom which normally slopes downwardly toward the front wall, said body being carried by wheel and axle means and being tiltable in an upright longitudinal plane between hauling and dumping positions, the center of gravity of the body being normally in front of the axle means when the body is in the hauling position and rearward of the axle means when the body is in the dumping position, a draft yoke including side arms which extend rearwardly in spaced relationship to opposite side walls of the body, means providing pivotal connections between the side arms and the adjacent side walls of the body at positions below the tops of the side walls, said pivotal connections being axially aligned and normally forward of the axle means so that the body is swingable relative to the side arms between said hauling and dumping positions, hydraulic rams mounted on and extending upwardly from the side arms forwardly of the last mentioned means and connected to the body for lifting the body upwardly at the front end relative to the draft yoke to the dumping position, said hydraulic rams being of the multi-stage type with one stage double acting for returning the body from the dumping position to one in which gravitational forces urge the body toward the hauling position, and the normal downward slope of the body bottom being so related to the length of the first lifting stages of the rams that the body bottom is raised to an approximately level position by said first lifting stages.

13. In a rear dump trailer, the combination comprising a body which is open at the top and at the back end and has front and side walls and a bottom which normally slopes downwardly toward the front wall, said body being carried by wheel and axle means and being tiltable toward and from the back end between dumping and hauling positions, the center of gravity of the body being normally in front of the axle means when the body is in the hauling position and rearward of the axle means when the body is in the dumping position, a draft yoke including side arms which extend rearwardly in spaced relationship to opposite side walls of the body, means providing pivotal connections between the side arms and the adjacent side walls of the body at axially aligned positions below the tops of the side walls and normally forward of the axle means so that the body is swingable in a vertical plane relative to the side arms between said hauling and dumping positions, hydraulic rams mounted on and extending upwardly from the side arms forwardly of the last mentioned means and connected to the body for lifting the body upwardly at the front end relative to the draft yoke to the dumping position, said hydraulic rams being of the multi-stage type with one stage double acting for returning the body from the dumping position to one in which gravitational forces urge the body toward the hauling position, and the angular body movement produced by the first lifting stage of each ram being approximately equal to the downward slope of the body bottom relative to a horizontal plane when the body is in the hauling position.

14. In a rear dump trailer as defined in claim 8, said side arms being hollow and of box-type section and having openings in the longitudinal mid-portions of the tops thereof, and said rams extending into the arms through said openings and being swingably mounted on the arms for movements about axes above the tops of the arms.

15. In a rear dump trailer as defined in claim 8, the longitudinal mid-portions of the side arms being enlarged laterally with respect to the end portions thereof and having top openings therein at the enlarged mid-portions to provide wells in which the lower ends of the rams are mounted.

References Cited in the file of this patent

UNITED STATES PATENTS

| | | |
|---|---|---|
| 1,870,673 | Detrick | Aug. 9, 1932 |
| 2,047,051 | Armington et al. | July 7, 1936 |
| 2,321,198 | Graves | June 8, 1943 |
| 2,339,518 | Reisser | Jan. 18, 1944 |
| 2,450,721 | Ditzler | Oct. 5, 1948 |
| 2,561,211 | Le Tourneau | July 17, 1951 |
| 2,606,376 | Mork | Aug. 12, 1952 |
| 2,621,964 | Le Tourneau | Dec. 16, 1952 |
| 2,623,602 | Double | Dec. 30, 1952 |
| 2,650,440 | Quartullo | Sept. 1, 1953 |
| 2,720,418 | Le Tourneau | Oct. 11, 1955 |
| 2,730,401 | Rea | Jan. 10, 1956 |